Patented Sept. 6, 1938

2,129,416

UNITED STATES PATENT OFFICE 2,129,416

BITUMINOUS EMULSION

Benjamin Foster and Carl J. Seydel, Philadelphia, Pa., assignors to Benjamin Foster Company, Philadelphia, Pa., a corporation of Delaware No Drawing. Application December 24, 1936, Serial No. 117,661

5 Claims. (Cl. 134—1)

This invention relates to improvements in bituminous emulsions, and to process of making the same. The emulsions described and claimed herein have been found to be exceptionally useful in the manufacture of certain types of emulsion-containing paper, in the ceramic industry as a bonding agent prior to the firing of the shaped products, for coatings such as paints and enamels particularly for metal surfaces, and for other uses.

An object of the invention is to provide an emulsion, a coating of which after drying is substantially waterproof, and will withstand a relatively high temperature without running, (in some cases temperatures as high as a red heat, at which temperature the bitumen will have charred), is relatively inexpensive, and that is substantially permanent in that it may be stored in barrels or other receptacles without settling or other change in properties.

A further object is to provide an emulsion, the dispersed bituminous particles of which are substantially uniform in length, and have shapes of such character that the dispersed bituminous particles interlock, or interweave, closing the voids, upon being applied as a coating upon a surface, and drying.

The emulsions described herein consist, broadly, of stable dispersions of a bitumen, in the dispersed or internal phase, and water in the continuous or external phase; the bitumen being commingled with the particles of a suitable clay slurry. The clay slurry and emulsions are produced as described in greater detail hereafter, by first stirring a suitable type of colloidal clay with water, heating the slurry to a desired temperature, and then pouring the heated slurry into a mixing machine, and while the mixer is running, pouring in a liquified bitumen and continuing the mixing until emulsification has taken place. For some emulsions an additional quantity of water may be added while the mixer is running, and thereafter an additional quantity of liquified bitumen; further quantities of water and liquified bitumen may be added, alternately, with continuous mixing, until a desired emulsion is obtained. Upon completion of the mixing operation, the emulsion may be poured into suitably receptacles for storage, or shipment.

The preferred type of colloidal clay suitable for the present emulsions is characterized by both its pH value when mixed into a slurry, and by its settling properties when thoroughly dispersed in a given excess of water; the clays do not form smooth jelly-like masses when dispersed in a definite quantity of water, like bentonite, but have positive settling values. Suitable colloidal clays have been found in several parts of the United States, they are practically free from sand or other coarse particles, and vary in color. One type of clay found in Maryland has a gray color, and when made into a thin slurry and poured through a 200 mesh sieve, it left 0.4 percent by weight of coarse particles; other suitable clays have a tan or buff to a reddish tint. With 25 grams of a suitable clay made into a slurry with 75 grams of water, the slurry then poured into a glass tube 175 mm. long, and 25 mm. diameter, the tube then stoppered and allowed to stand twelve days at room temperature, (about 21° C., 70° F.), a settling of from 8 to 14 mm. (that is, 8 to 14 mm. of supernatant water) takes place. Such a slurry should have a pH value of from 4.7 to about 5.5, and may reach a value as high as 6.8; however, clays with a settling value of about 8 to 10 mm. in twelve days, and a pH value of from 4.8 to 5.2 are preferred. These two characteristics appear to constitute reliable guiding principles and are so used in the selection of efficient clays for the emulsions described herein. One efficient clay gave the following analysis, but the clays are selected by their physical properties, and not their chemical analysis.

| | Percent |
|---|---|
| $SiO_2$ | 58.25 |
| $Al_2O_3$ | 27.20 |
| CaO | 0.22 |
| MgO | 0.50 |
| $TiO_2$ | 1.26 |
| $Fe_2O_3$ | 1.69 |
| $Na_2O$ | 0.54 |
| $K_2O$ | 1.18 |
| Loss on ignition | 9.54 |

(This clay had a normal pH value of 4.8 to 5.0.)

Twenty-five grams of the above clay were made into a slurry with 75 grams of water, placed in a 175 x 25 mm. tube, stoppered, and allowed to settle twelve days at room temperature; it settled 8 mm., and had a pH value of 4.8. This clay made a highly efficient emulsion with bitumen. The same quantities of other useful clays and water settled from 7 to 14 mm. in twelve days, and had pH values varying from 4.7 to 5.4; the emulsions made from these clays were still highly efficient, but slightly less so than that which settled 8 mm. with a pH value of 4.8. The settling, apparently, should be between 0.45 percent, and 0.8 percent from the top, preferably from 0.46 percent to about 0.55 percent, or about 0.5 percent; such a clay having a pH value of about 4.8 to 5.2 would be highly efficient for emulsions in accordance with this invention. When the settling is less than 7 mm., or more than 20 mm. even with acceptable pH values, the emulsions obtained are relatively very poor; with a still greater divergence from the preferred constants, the clays are useless for this invention. With correct settling values, and with pH values just below 4.7, or just above 6.8, the emulsions obtained are also relatively very poor; with a still greater divergence in pH values below 4.7, or above 6.8, the clays are also useless for the present type of emulsions.

By the term "bitumen" as used in this case, is included such substances as asphalts, pitches, rosin, resins, waxes, tars, animal pitch, stearine pitch, cottonseed pitch, and similar materials. Highly efficient emulsions may be made with any of the above products. Suitable asphalts may have penetrations of from 50 (softening point about 60° C. (140° F.)) to a penetration as high as 200 (softening point about 20° C. (68° F.)) for different types of emulsions. A complete range of emulsions can be made from material so soft that at room temperature the bitumen is a liquid; or from bitumen which contains gilsonite; it is merely a matter of temperature control during the mixing to produce emulsions from various softening point bitumens.

In practice, a stock clay slurry containing from about 35 percent to about 40 percent of clay (which contains, as removed from the ground, about 22 percent of moisture), with about 65 percent to about 60 percent of water, is used. These proportions may vary to some extent. Usually, 300 pounds of clay and 500 pounds of water are used. The clay is broken up, and after placing in a suitable mixer, preferably of the "pug mill" type, water is added slowly and the mixer started; additional quantities of water being added during the mixing as it is taken up by the clay. The slurry thus prepared may be used immediately, or it may be stored indefinitely. Such a slurry will be of a thick creamy consistency, and will just pour. When it is to be used, it is first heated to a desired temperature, then poured into a suitable emulsifying mixer of any practical type, such as the "paddle type", "ribbon type", or "pony change-can type", such as used in mixing paints, or a "colloid mill type". The operating temperatures, and the time required for emulsification, also the degree of fineness of bituminous particles will vary somewhat with the type of mixers used, but the above types of mixers have produced highly efficient emulsions.

*Examples*

For one type of emulsion, use—
5 pounds of the above slurry, heated to from 25° C. (77° F.) to 40° C. (104° F.) are placed in a mixer and while stirring, add—
5 pounds of liquified asphalt (50–60 penetration, melting point 60° C. (140° F.) and heated to from 100° C. (212° F.) to about 150° C. (302° F.)), poured as a continuous stream into the mixer; emulsification takes place at once, the emulsification temperature being about 52° C. (125.6° F.). This product may be modified by further additions of water and liquified asphalt, while stirring.

The temperature to which the asphalt is heated varies inversely with the temperature to which the slurry is heated. With a given asphalt, and the slurry heated to a relatively low temperature, the asphalt is heated to a relatively higher temperature; with high temperature of slurry, relatively lower temperatures for asphalt are used. With asphalts of about 50 penetration, the temperature to which it is heated will be higher than with an asphalt of much higher penetration; for example, with a given slurry temperature, say 35° C.–40° C. (95° F.–104° F.) a 50 penetration asphalt may be heated to from 125° C. (257° F.) to about 150° C. (302° F.); while with the same slurry temperature a high penetration asphalt may require temperatures from about 75° C. (167° F.) to about 115° C. (239° F.).

An emulsion with the same quantities of materials may be made with the clay slurry originally heated to about 50° C. (122° F.), and the asphalt heated to from about 75° C. (167° F.) to about 115° C. (239° F.), with the emulsification taking place at about 100° C. (212° F.).

For another practical emulsion, use—
300 pounds of clay, (containing about 22 percent of moisture),
500 pounds of water; heat slurry to from 35° C. (95° F.) to upwards of 50° C. (122° F.) and pour into the running mixer; add—
800 pounds of liquified asphalt, at a temperature of from about 75° C. (167° F.) to upwards of 150° C. (302° F.) to slurry as a continuous stream. With the slurry at about 35° C. (95° F.) the asphalt should be 115° C. (239° F.) to about 150° C. (302° F.); while with the slurry at about 50° C. (122° F.) the asphalt temperature may be from 75° C. (167° F.) to about 115° C. (239° F.). (As noted above, the temperature of the asphalt will vary inversely with the slurry temperature, and the penetration number of the asphalt.)

After emulsification has taken place, stir and add—
300 pounds of water at 35° C. (95° F.) to about 40° C. (104° F.) and continue stirring, then add as a continuous stream—
300 pounds of liquified asphalt at from 75° C. (167° F.) to about 150° C. (302° F.) with continuous stirring; thereafter add—
300 pounds of water at 35° C. (95° F.) to about 40° C. (104° F.), stir, add—
300 pounds of liquified asphalt at from 75° C. (167° F.) to 150° C. (302° F.) and stir until emulsification is complete. Repeat if desired.

Final compositions of emulsions may contain from about six percent to about seventy percent of clay.

Typical emulsions may contain—
6 percent of clay; 54 percent of asphalt; 40 percent of water;
40 percent of clay; 30 percent of asphalt; 30 percent of water;
70 percent of clay; 15 percent of asphalt; 15 percent of water.

One practical emulsion contains—
10 percent of clay; 50 percent of asphalt; 40 percent of water.

Under the conditions of temperature and mixing described herein, the liquified bitumen is dispersed by the clay slurry into particles of generally uniform shape, varying from 0.01 mm. to about 0.02 mm. in length, with a diameter about one-half of the length. As the mixing proceeds, the temperature of the mass being mixed increases due to the work expended in stirring, and to the temperature of the bitumen added; however, the temperature increase of the stirred mass should be maintained below the coalescing point of the bitumen used. During the mixing, the dispersed bituminous particles, produced by the grinding action of the clay and water, and maintained separated by reason of the temperature being below the coalescing point and the presence of the water, coats or surrounds the clay particles, since the bituminous particles are many times the size of the clay particles. Due to the water repellant character of the surfaces of the bituminous particles, a stable dispersion is produced which cannot be broken down by the addition of either acids or alkalies, but the consistency of the emulsions may be changed by such additions. The emulsions produced may be further diluted by the addition of desired quantities of water, and further mixing. A sample of the final emulsions, when mixed with water and examined under a microscope, exhibits particles of dispersed bituminous matter, which particles, as noted above, will have a length of about twice the diameter, but this will vary. The dispersed particles have rounded surfaces and end portions, are regular in shape, and may be termed "elliptical spheroids" or "ovoids"; they are distinctly not spherical; they are generally brownish in color with asphalts, with steam distilled asphalt the color is distinctly brown; however, the color will naturally vary with the original color of the bitumen used; for example, with stearine pitch, or cotton-seed pitch, the color is a very light tan.

We prefer to use a single clay having the characteristics described herein, to a mixture of different clays, and to a single clay which has been "adjusted" by chemicals, such for example, as chemicals the aqueous solutions of which give an acid reaction to litmus. Mixtures of clays are simply mixtures of two or more finely divided solids, and the individual particles of such solids are separately coated during the emulsification process, the resulting emulsion consisting really of a mixture of emulsions and not a single homogeneous emulsion; such mixtures of emulsions are less homogeneous and are more liable to disintegrate after drying and on exposure to the atmosphere than an emulsion made from a single clay; they are less durable. With dispersed single clays adjusted by chemical adjusting agents, usually of an acid reacting character, to a desired pH, a film of the chemical remains in contact with the clay particle and is coated and enclosed by the coating of bitumen during the emulsification process; after drying, in the course of time, this chemical hastens the disintegration of the coating, the acid chemical is not only corrosive but is generally deliquescent and when exposed for a considerable time the bituminous coating is more apt to flake and peel off than would have been the case if the chemical adjusting agent had been absent. Such adjusted emulsions are on this account less durable than single natural clay emulsions.

As noted above, the dispersed particles of the emulsion have a generally regular shape with an estimated length of from about 0.01 mm. to about 0.02 mm., (in one test, about ninety-eight percent of the dispersed emulsified particles were about 0.01 mm. long). The diameters are about one-half the length, from about 0.005 mm. to about 0.01 mm., according to the length. Due to their generally uniform "elliptical spheroid" or "ovoid" shape, on settling out on a surface the dispersed bituminous particles intermesh, or interweave, or "felt" with each other, closing the voids, and after drying form an adherent highly waterproof and highly water repellant coating. A coating of one-sixteenth inch in thickness on a glass plate was allowed to dry in the air at room temperature, then heated to 105° C. (219° F.) for two hours. After cooling it was weighed, then immersed in tap water at room temperature for twenty-four hours, removed, excess of water wiped off, and reweighed. Less than three-fourths percent of water had been taken up by the coated film. A fine wire screen was painted with an emulsion, allowed to dry, and later heated to redness; the bitumen charred but the emulsion did not run. With a similar test upon a metal sheet, heated to redness, the coating did not scale off after charring, the clay in the emulsion adhered to the metal surface. The emulsions are very efficient in the manufacture of certain types of paper or cardboard, the particles commingling with the cellulose fibres to produce uniform colors. They also constitute excellent bonding agents in the ceramic industry, facilitating the shaping of the ceramic articles, increasing their strength and thereby enabling them to withstand more severe handling before baking; upon firing, the bituminous matter is burned out leaving the ceramic articles in the desired color. Many other uses have been found for these emulsions.

We claim—

1. An aqueous bituminous emulsion, comprising bituminous matter in the internal phase, and water in the external phase, in which an individual colloidal clay slurry is the dispersing agent, said clay slurry having a pH value of about 4.8, and the clay having a settling value in three times its weight of water of from about 0.47 percent to about 0.6 percent, and in which the length of the particles of bituminous matter is between 0.01 mm., and 0.02 mm., and containing between six percent and seventy percent of clay, and between fifty-four percent and fifteen percent of bitumen, with the remainder of water.

2. An aqueous bituminous emulsion, as in claim 1, in which the pH value of the clay slurry is from 4.7 to about 6.8, and the clay has a settling value of from 0.47 percent to about 0.8 percent.

3. An aqueous bituminous emulsion, comprising bituminous matter in the internal phase, and water in the external phase, in which an individual colloidal clay slurry is the dispersing agent, said clay slurry having a pH value of about 4.8, and the clay having a settling value of from about 0.47 percent to about 0.6 percent in three times its weight of water, and in which the length of the particles of the dispersed bituminous matter is between 0.01 mm. and 0.02 mm., and containing about ten percent of clay, about fifty percent of bitumen, with the remainder of water.

4. An aqueous bituminous emulsion, as in claim 3, in which the pH value of the clay clurry is from 4.7 to about 6.8, and the clay has a settling value of from 0.47 percent to about 0.8 percent.

5. An aqueous bituminous emulsion, as in claim 3, in which the pH value of the clay slurry is from 4.7 to about 6.8, and the clay has a settling value of from 0.47 percent to about 0.8 percent, and the dispersed bituminous particles have an average length between 0.01 mm., and 0.02 mm., and an average diameter of about one-half of the length.

BENJAMIN FOSTER.
CARL J. SEYDEL.